UNITED STATES PATENT OFFICE

PAUL LAEUGER, OF BASEL, SWITZERLAND, ASSIGNOR TO THE FIRM J. R. GEIGY S. A., OF BASEL, SWITZERLAND

MANUFACTURE OF ACID DYESTUFFS OF THE PHENONAPHTHOSAFRANINE SERIES AND THE PRODUCTS

No Drawing. Original application filed February 4, 1927, Serial No. 166,021, and in Germany February 13, 1926. Divided and this application filed June 30, 1928. Serial No. 289,630.

This application is divisional of the application Ser. No. 166,021, filed February 4, 1927.

According to the present invention, blue to green-blue acid dyestuffs of the phenonaphthosafranine series which, when dyed, are fully fast to alkali, very fast to light and for the greatest part have good equalizing properties, are obtained by condensing an unsymmetrical N-alkyl-para-phenylenediamine derivative having a sulpho-group in ortho position to the primary amino group according to the formula:

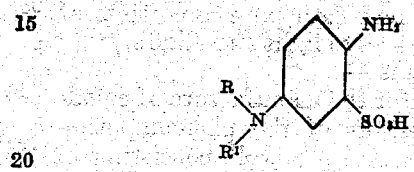

with an isorosindulinesulphonic acid of the general formula:

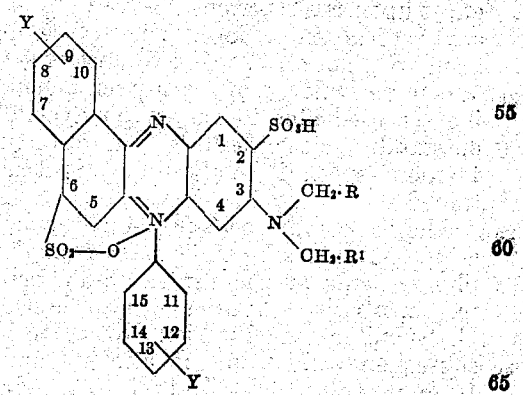

having at least two sulpho-groups, one of them being in position 6, the other in position 2 and the third, if it be present, in any position, whereby in the above formulæ R and $R^1$ stand for hydrogen or alkyl and Y for a sulpho or acetamido group.

The reaction takes place according to the following equation:

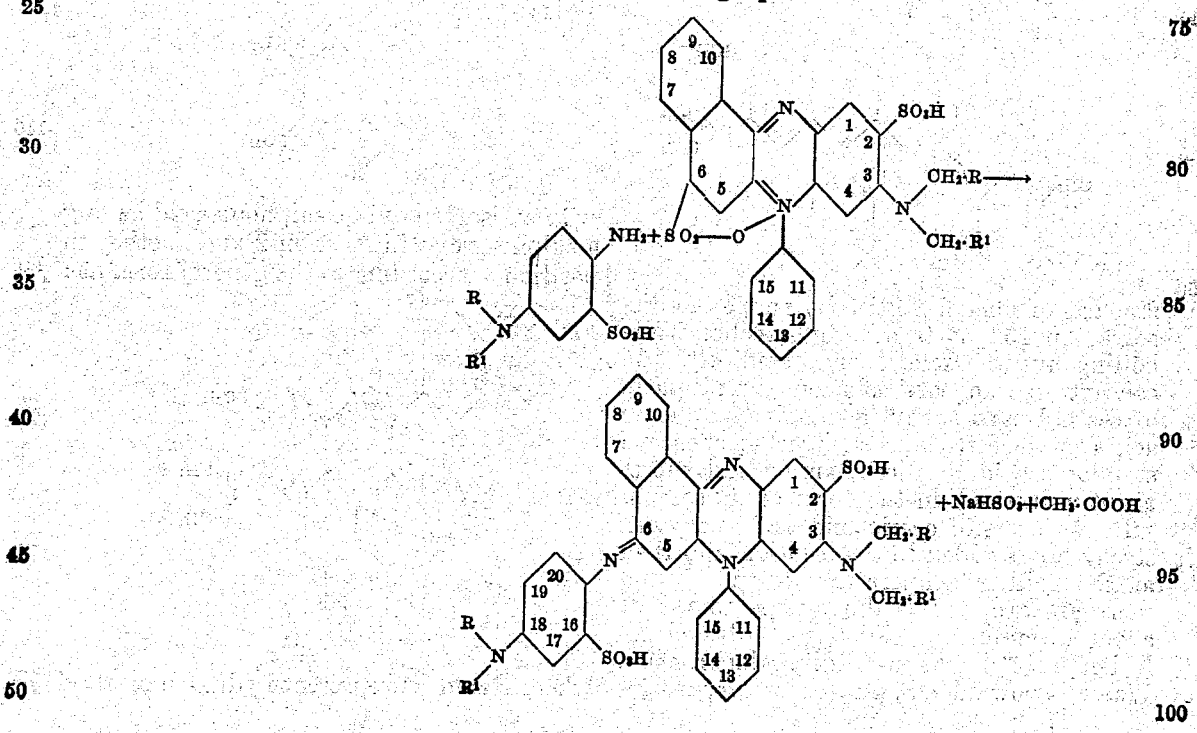

The resulting phenonaphthosafranine sulphonic acids are characterized by the ortho-(16)-position of one sulpho-group to the safranine-nitrogen, which has the effect in general of improving the solubility and the fastness to fulling as well as a marked shifting of the tints toward green-blue. Especially owing to this -16-sulpho-group the dyestuffs are fast to alkali.

The dyestuffs obtained according to this process are soluble in water and in sulphuric acid.

This process of manufacture could not be foreseen, since no similar kind of condensation with ortho-aminoaryl-sulphonic acids has been discovered and the known hindering effect upon the reactions possessed by strong acid radicals in ortho-position to the amino-group did not allow of a prospect of success. When derivatives of para-phenylene-diamine are used blue to blue-green dyestuffs of outstanding clearness of tint and pronounced fastness especially to alkali and light are obtained.

The isorosinduline-6-sulphonic acids used as parent materials can be made from the sulphonic acids of the neutral blue series by treatment with sulphites in accordance with U. S. patent specification No. 617,703 and subsequent oxidation. Positions 4 and 8 to 15 may contain alkyl-, alkyloxy-, hydroxy-, carboxy- or acidylamino-groups and halogen.

The following example illustrates the invention, the parts being by weight:

For the manufacture of the dyestuff having the formula

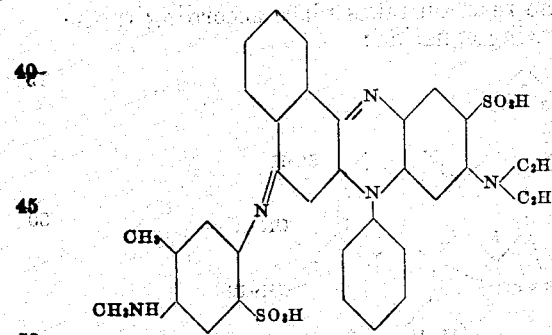

22 parts of phenyl-β-naphthylamine are dissolved in 250 parts of ethyl-alcohol while boiling and the solution is mixed with the concentrated aqueous solution of 24.5 parts of diethyl-para-phenylenediamine sulphonic acid (obtained from para-nitrochlorobenzene-sulphonic acid + diethylamine and subsequent reduction) in the form of its sodium salt. 55 parts of acetic acid of 80 per cent. strength are added to the solution and then at the boiling temperature of the alcohol there are dropped in during the course of about 45 minutes a highly concentrated solution of 31 parts of sodium bichromate. Water is now added and if necessary a portion of the alcohol is distilled; the diethylisorosinduline-2-monosulphonic acid which separates in form of needles of coppery appearance is washed free from chromium by means of water. In concentrated acetic acid the dyestuff dissolves to a green blue solution.

The dyestuff is converted into the easily soluble blue green diethylisorosinduline-2:6-disulphonic acid by boiling with 90 parts of commercial bisulphite solution and subsequent oxidation of the soluble leuco-compound by means of air. It dyes wool green blue, muddy tints and dissolves in concentrated sulphuric acid to a brown-violet solution.

It is now condensed by boiling for several hours in a reflux apparatus in presence of 15 parts of sodium acetate with 22 parts of para-aminomonomethyl-ortho-toluidine-meta-sulphonic acid (made by reduction of nitranilineazomono-methyl-ortho-toluidine-metasulphonic acid) which has been previously treated with somewhat more than the theoretical proportion of sodium carbonate to produce a feebly alkaline solution. The bronze crystalline powder obtained by salting out is a dyestuff showing a grass-green reaction with sulphuric acid and dyeing animal fibre in a sulphuric acid bath pure, blue tints of remarkable fastness to light and alkali.

What I claim is:—

1. A process for the manufacture of equalizing acid dyestuffs of the phenonaphthosafranine series fast to alkali, consisting in condensing an unsymmetrical N-alkyl-para-phenylenediamine derivative having a sulpho-group in ortho position to the primary amino-group according to the general formula:

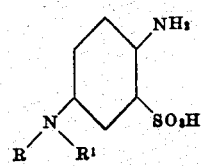

with an isorosinduline sulphonic acid having a sulpho-group in position 2 and another in position 6, according to the general formula:

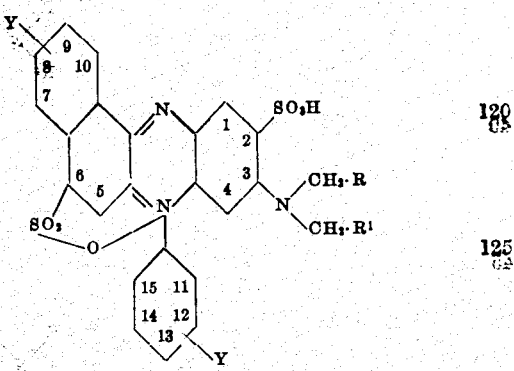

where R and R¹ represent hydrogen or alkyl and Y represents a sulpho or acetamido group.

2. A process for the manufacture of equalizing acid dyestuffs of the phenonaphthosafranine series fast to alkali, consisting in condensing an unsymmetrical N-alkyl-para-phenylenediamine derivative having a sulpho-group in ortho position to the primary amino-group according to the general formula:

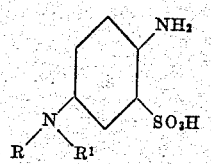

with an isorosinduline sulphonic acid having a sulpho group in position 2, another in position 6 and a third in any position, according to the general formula:

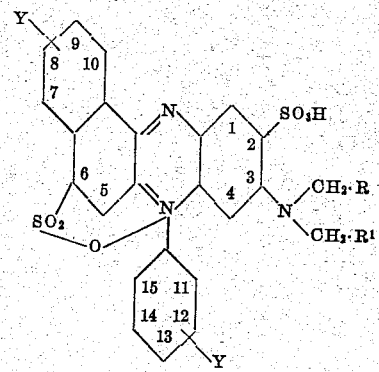

where R and $R^1$ represent hydrogen or alkyl and Y represents a sulpho or acetamido group.

3. As new articles of manufacture the herein described dyestuffs of the phenonaphthosafranine series obtained by condensing an isorosinduline sulphonic acid having at least two sulpho-groups with an unsymmetrical N-alkyl - para - phenylenediamine derivative having a sulpho-group in ortho-position to the primary amino group, and constituted according to the formula:

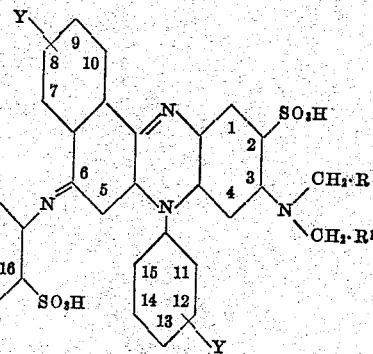

where R and $R^1$ represent hydrogen or alkyl, and Y represents a sulpho or acetamido group, said dyestuffs constituting dark powders soluble in water with reddish blue to greenish blue coloration, dissolving in sulphuric acid with a green to violet color and yielding on the animal fibres blue to greenish blue tints fast to alkali and light.

In witness whereof I have hereunto signed my name this 21st day of June, 1928.

PAUL LAEUGER.